US012675603B2

(12) United States Patent
Assayag et al.

(10) Patent No.: US 12,675,603 B2
(45) Date of Patent: Jul. 7, 2026

(54) SOFTWARE DEVELOPMENT PLATFORM REPOSITORY AND ACCOUNT DISCOVERY

(71) Applicant: Zscaler, Inc., San Jose, CA (US)

(72) Inventors: Jonathan Assayag, Ofaqim (IL); Shoham Danino, Tel-Aviv (IL)

(73) Assignee: Zscaler, Inc., San Jose, CA (US)

( * ) Notice: Subject to any disclaimer, the term of this patent is extended or adjusted under 35 U.S.C. 154(b) by 110 days.

(21) Appl. No.: 18/892,944

(22) Filed: Sep. 23, 2024

(65) Prior Publication Data

US 2026/0087166 A1      Mar. 26, 2026

(51) Int. Cl.
*G06F 21/62*          (2013.01)

(52) U.S. Cl.
CPC .............................. *G06F 21/6245* (2013.01)

(58) Field of Classification Search
CPC .................................................. G06F 21/6245
See application file for complete search history.

(56) References Cited

U.S. PATENT DOCUMENTS

| | | | | |
|---|---|---|---|---|
| 9,251,113 | B1 * | 2/2016 | McIlroy | ............ G06F 15/17306 |
| 10,469,670 | B2 * | 11/2019 | Ballai | .................. H04W 12/126 |
| 10,733,241 | B2 * | 8/2020 | Govindarajan | ......... G06F 16/93 |
| 12,067,637 | B1 * | 8/2024 | Ravi | .................... G06Q 50/265 |

| | | | | |
|---|---|---|---|---|
| 12,489,778 | B1 * | 12/2025 | Hammerle | .......... H04L 63/1433 |
| 2007/0208869 | A1 * | 9/2007 | Adelman | ............. G06Q 10/107 |
| | | | | 709/229 |
| 2007/0208940 | A1 * | 9/2007 | Adelman | ............. G06Q 10/107 |
| | | | | 713/168 |
| 2007/0294431 | A1 * | 12/2007 | Adelman | ............. G06Q 10/107 |
| | | | | 709/245 |
| 2014/0074928 | A1 * | 3/2014 | B'Far | .................... H04L 67/306 |
| | | | | 709/204 |
| 2015/0293997 | A1 * | 10/2015 | Smith | .................... G06F 16/95 |
| | | | | 707/E17.014 |
| 2016/0005050 | A1 * | 1/2016 | Teman | ................. G06Q 30/018 |
| | | | | 705/317 |
| 2018/0302430 | A1 * | 10/2018 | Israel | .................... G06F 21/604 |
| 2023/0237134 | A1 * | 7/2023 | Douglas | ................ G06F 21/316 |
| | | | | 713/186 |
| 2024/0129323 | A1 * | 4/2024 | Garyani | ................ G06F 21/554 |
| 2024/0250960 | A1 | 7/2024 | Danino et al. | |
| 2024/0256878 | A1 * | 8/2024 | Palleti | ...................... G06N 3/08 |
| 2024/0323022 | A1 * | 9/2024 | Herlands | ............. G06F 21/6245 |

* cited by examiner

*Primary Examiner* — Darren B Schwartz
(74) *Attorney, Agent, or Firm* — Baratta Law PLLC; Lawrence A. Baratta, Jr.

(57)          ABSTRACT

Systems and methods for detecting SDP user accounts that are associated with a company include querying a software development platform for account and repository data based on a customer name for each account analyzing associated account and repository data, generating a score for each account of the plurality of accounts based on the analyzing, the score being indicative of an account belonging to the customer, and labeling one or more accounts of the plurality of accounts as belonging to the customer based on the score.

16 Claims, 8 Drawing Sheets

Querying an SDP for account and repository data, the querying being based on a customer name
801

Generating a Score for each account based on the analyzing, the score is indicative of the account belonging to the customer
802

Labeling one or more accounts as belonging to the customer based on the score.
803

500

Obtain Customer information for scanning

501

Identify Customer's public repositories

502

Scan the repositories for data leakage

503

700

800

Querying an SDP for account and repository data, the querying being based on a customer name

801

Generating a Score for each account based on the analyzing, the score is indicative of the account belonging to the customer

802

Labeling one or more accounts as belonging to the customer based on the score.

803

SOFTWARE DEVELOPMENT PLATFORM REPOSITORY AND ACCOUNT DISCOVERY

FIELD OF THE DISCLOSURE

The present disclosure relates generally to networking and computing. More particularly, the present disclosure relates to systems and methods for a cloud-based system configured to discover customer's SDP repositories that contain sensitive data for tenants.

BACKGROUND OF THE DISCLOSURE

Public repositories which can be used to share code, documents, or other information between parties have become essential to modern developers. Specifically, the software development ecosystem tends to use such public software development platforms to facilitate collaboration, knowledge sharing, and remote work situations. Common platforms such as GitHub, GitLab, and Bitbucket are commonly used to host millions of projects in a variety of fields. Moreover, such platforms can provide developers with the ability to contribute to open-source projects, share code collaborate and problem solve, and manage version control. However, along with their benefits, these software repositories pose significant risks particularly concerning the inadvertent leakage of sensitive data, or data which belongs to outside companies.

Sensitive data can refer to information which is private or confidential and need protection from unauthorized access. Such sensitive data can include company or corporate information, private or security information of individuals or organizations, personal identifiable information, credential, API keys, passwords, and private keys, proprietary code, and business critical information. Given the millions of users which frequent public repositories, sensitive data leaks are bound to happen through the public repository. When such data is unintentionally included in public repositories, its security is compromised which can pose severe security threats.

The consequences of security breaches through public repositories can be widespread. For example, the unintentional dissemination of code through the public repository can include security breaches through exposed credentials, identity theft, leakage of PII, intellectual property theft, the loss of proprietary code and critical information, regulatory compliance issues, and erosion of trust. The state of the art currently includes labor intensive monitoring and audits which can be otherwise ineffective or marginally effective given the vastness of public repositories. The code or information can then be removed once it is identified through the monitoring. Such monitoring is often performed manually and can be resource and labor intensive. It is clear that there exists a need in the state of the art not yet met for increasing the speed and efficiency of finding sensitive code or information on public software repositories.

BRIEF SUMMARY OF THE DISCLOSURE

The present disclosure relates to systems and methods for identifying information in public software development platform sharing repositories. The method can be used to research a given customer's public software repositories and can then be used to scan the code for data leakage. The method can include querying a software development platform such as GitHub for data. The data can be account data or repository data. From there, the data can be analyzed based on a variety of parameters. Such analysis is configured to search for a variety of parameters. A score can be generated based on the results of the search which can be used to label or identify the accounts. The score can be used to determine the likelihood of the account belonging to the customer based on the score. A more thorough analysis can be conducted based on the likelihood of the account belonging to the customer associated with a company of interest.

In one aspect, disclosed is a method implemented by a cloud-based system, the method comprising steps of querying a software development platform for account and repository data, the querying being based on a customer name, for each account of a plurality of accounts, analyzing associated account and repository data, generating a score for each account of the plurality of accounts based on the analyzing, the score being indicative of an account belonging to the customer, and labeling one or more accounts of the plurality of accounts as belonging to the customer based on the score.

In a further aspect, disclosed is a non-transitory computer-readable medium comprising instructions that, when executed, cause one or more processors to perform the steps of querying a software development platform for account and repository data, the querying being based on a customer name, for each account of a plurality of accounts, analyzing associated account and repository data, generating a score for each account of the plurality of accounts based on the analyzing, the score being indicative of an account belonging to the customer, and labeling one or more accounts of the plurality of accounts as belonging to the customer based on the score.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Figure 1A:
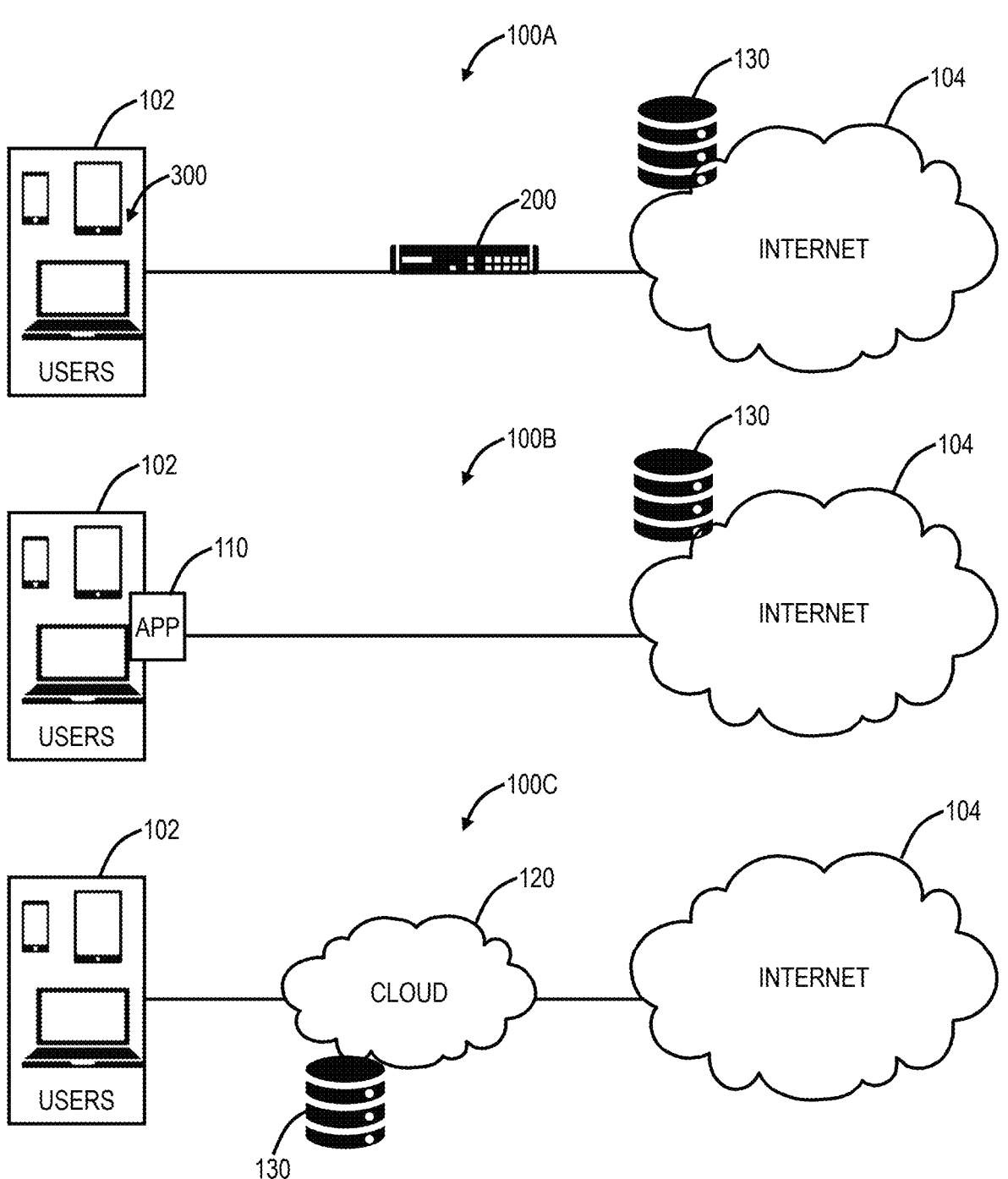
FIG. 1A is a network diagram of three example network configurations of cybersecurity monitoring and protection of a user.

Again, the present disclosure generally relates to systems and methods which can be used in identifying sensitive data on an online repository platform. Some systems and methods can be configured to identify parameters which are associated with a user and identify such parameters on online data repositories. The method can be implemented by a user device or optionally in the cloud. The method can query a database, such as a software development platform for data, such as account, user, or repository data. The query can be based on customer information or tenant information. It is envisioned that each account of a plurality of accounts can be queried. Systems and methods of the instant disclosure can be configured to analyze at least one of the accounts. A score based on the analysis can be provided based on at least the querying. The score can provide a quantitative estimate of how likely the user is associated with the customer or tenant. A label can be provided based on the score.

Additionally, the instant application generally relates to network security and External Attack Surface Management (EASM). It is envisioned that the methods and systems of the present disclosure can be configured to increase the efficiency and accuracy of identifying sensitive information which could have been, for example, introduced on an online data repository platform. Some methods can include a calculation based on the query of the customer information, and optionally a verification flag which can be defined based on the calculations. More generally, the verification flag can be a label assigned to an account in the SDP. The label can represent if the account is verified, providing a level of legitimacy to the account. Some systems and methods can be configured to operate on public servers or via the internet and can optionally require authentication. Moreover, some aspects of the method herein do not require authentication because the method operates with publicly available data.

The methods and systems described herein can be part of an EASM solution and can provide key data regarding a customer's attack surface. More specifically, methods of the disclosure can control or query online software repositories as a potential attack surface source. For example, the method can query a Software Development Platform (SDP) to identify a potential attack surface source. The method can determine or partially determine which users of a plurality of users engaged with the SDP are associated with the customer or tenant. The method can include a process which is configured to examine the SDP associated with a user to identify sensitive data leakages. Advantageously, the process can determine which users out of all the SDP users to examine without the customer or tenant providing any additional data other than the customer's information such as the customer's company name or company domain. In other words, the method can target users and identify sensitive data leaks such as passwords, keys, tokens, or the like which has been inadvertently uploaded to an SDP without requiring further sensitive information from the customer or tenant. The process provides the customer or tenant with broad visibility of its public users and SDPs which can be accessed by anyone. And be alerted in case of data leakage from those repositories. Again, the method of the instant disclosure can provide visibility of some or all customer's public SDP repositories and detection of sensitive information or data in the public SDP repositories.

§ 1.0 Cybersecurity Monitoring and Protection Examples

Figure 2:
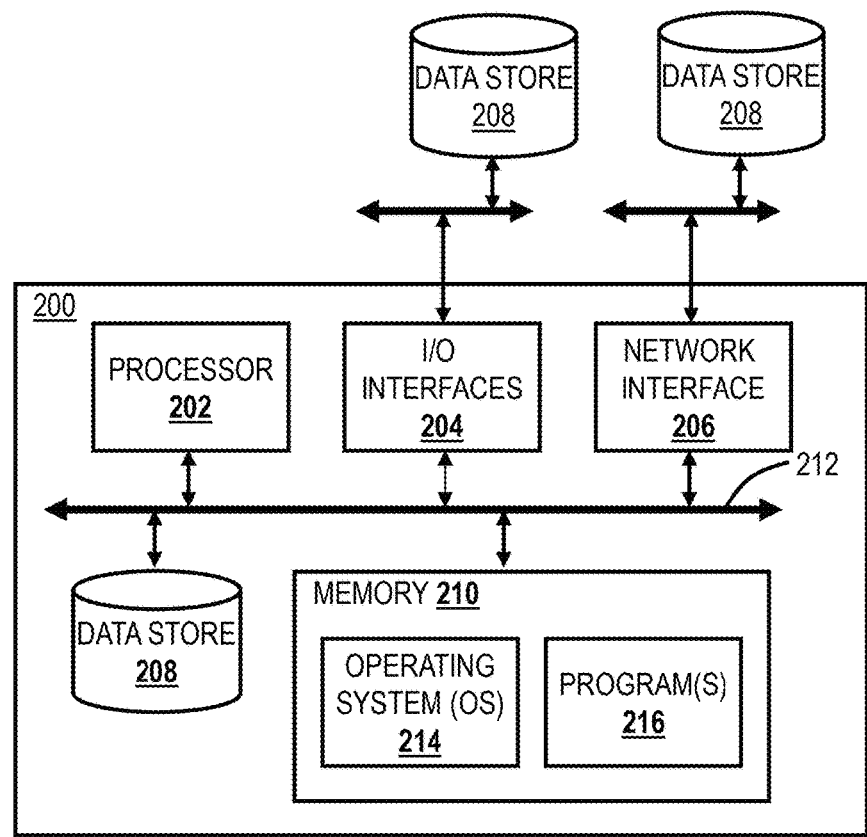
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located in line with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)—encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

§ 1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
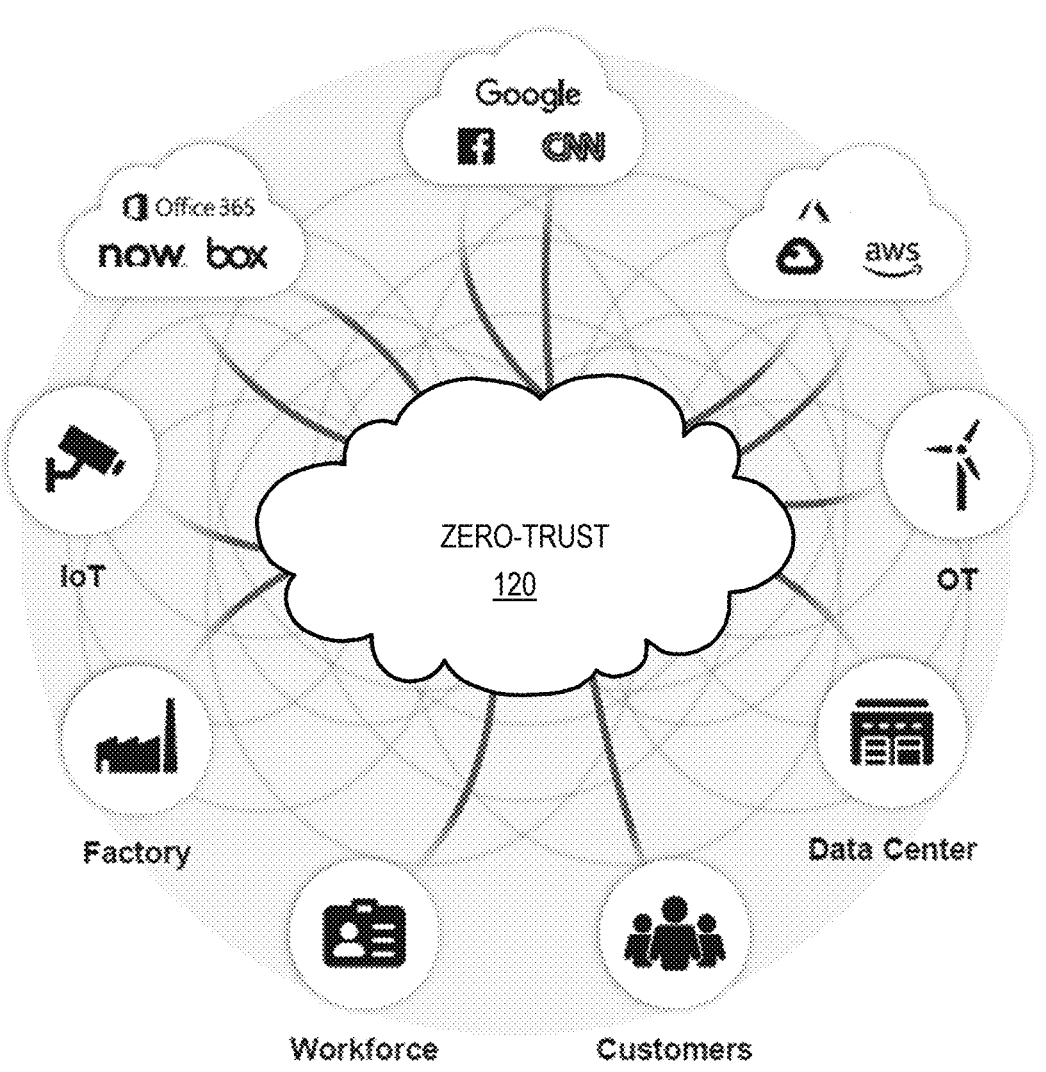
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

§ 2.0 Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

§ 3.0 Example Computing Device Architecture

Figure 3:
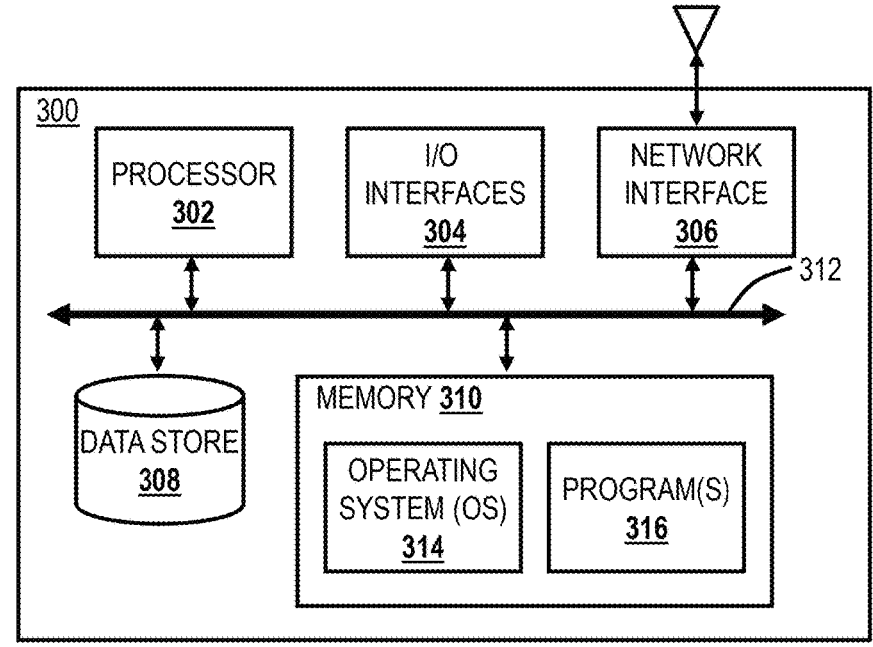
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
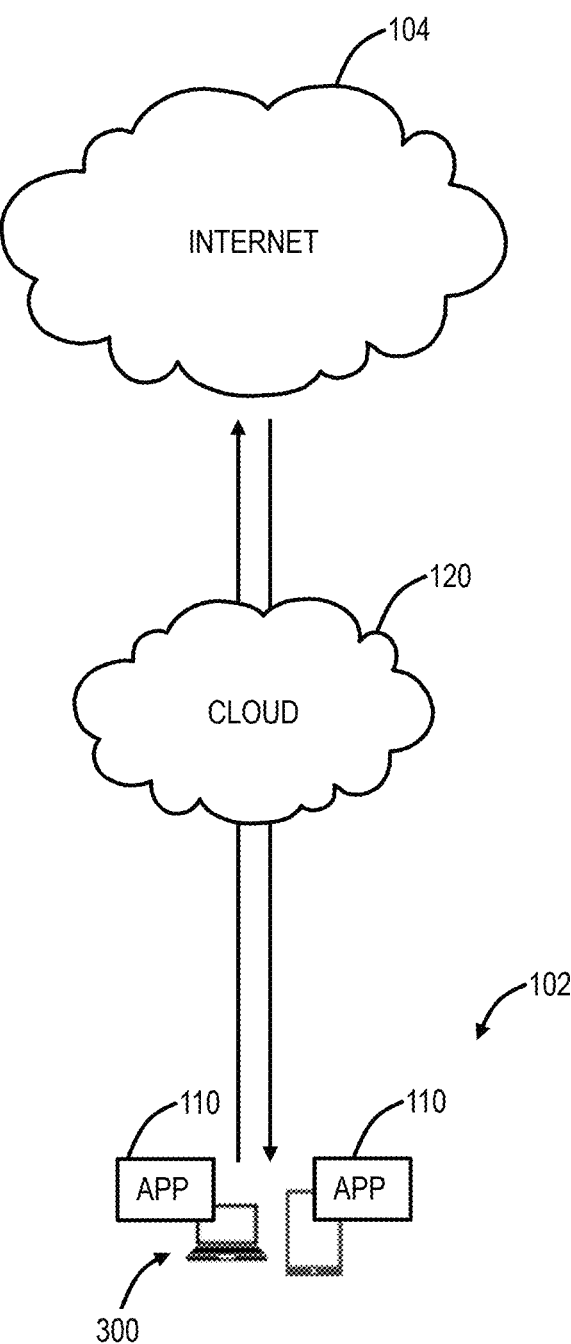
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best-in-class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

§ 5.0 Data Gathering

Figure 5:
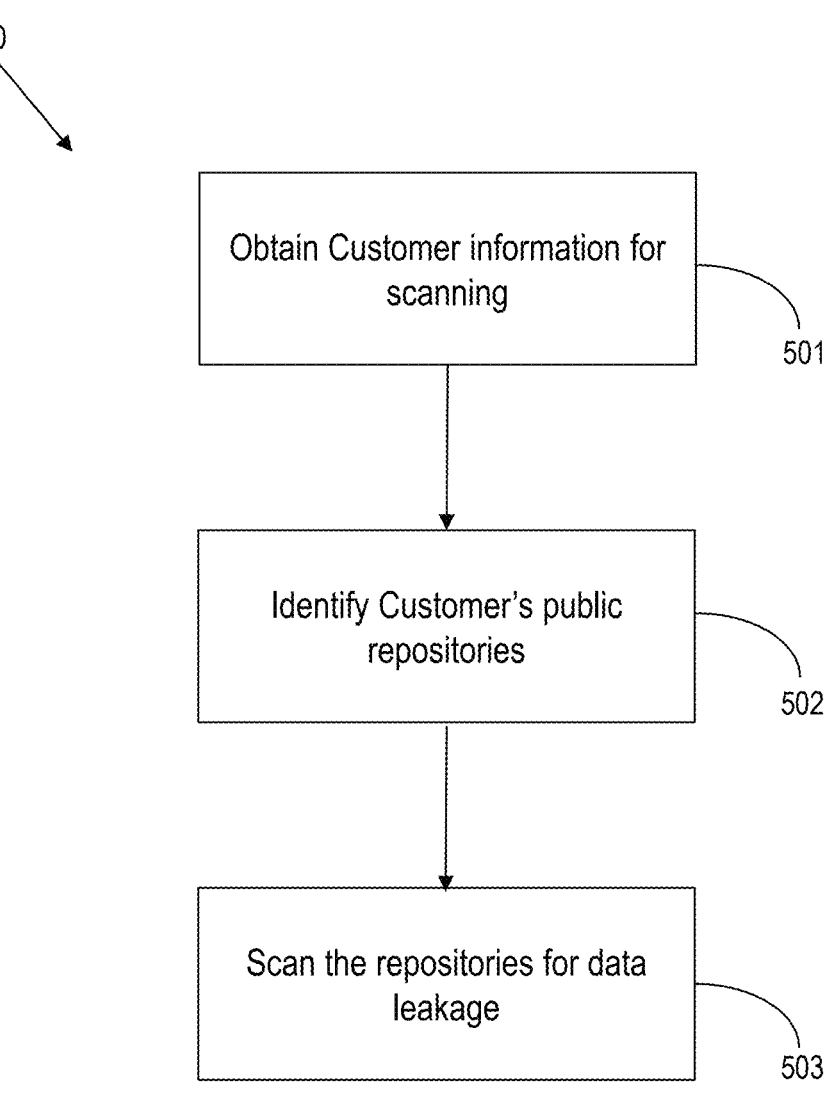
FIG. 5 is a flow chart of an exemplary EASM process in accordance with one aspect of the instant disclosure.

Turning now to FIG. 5, a flowchart of an External Attack Surface Management (EASM) method 500. The method 500 can include a plurality of steps for calculating an attack surface of a tenant of the cloud-based system (cloud 120). As used herein, the term "attack surface" generally refers to all the possible points of entry an attacker can exploit to gain unauthorized access to a system or network. A common attack surface can include Software Development Platform (SDP) data leaks. The SDP can be any public online service configured to provide tools, infrastructure, and data sharing for software development. Some SDPs can provide online collaboration platforms and can be publicly accessible. Examples of SDPs can include, without limitation to, GitHub, GitLab, BitBucket, SourceForge, CodePen, or any platform where one or more users can share and provide public access to data, such as computer code. A user can be any individual engaging with the SDP. Some methods can include an obtaining information step 501, an identifying repositories step 502, and a scanning 503 repository step. In some aspects, the SDP can be the attack surface.

In some aspects, the obtaining information 501 can include obtaining any information relative to a customer. The customer can be any entity, individual, or the like who is seeking EASM or using any portion of the methods and systems described herein. Information for the obtaining information 501 can include any information about the customer, which is publicly available, for example, information regarding the customer available on the internet. For example, such information can include domain names, website URLS, a company name, or the like. Some methods can use the company name as the customer information for scanning. As such, one example of the method 500 can include obtaining customer information for scanning 501, wherein the customer information is the name of the customer. In some aspects, the customer is the tenant.

Figure 6:
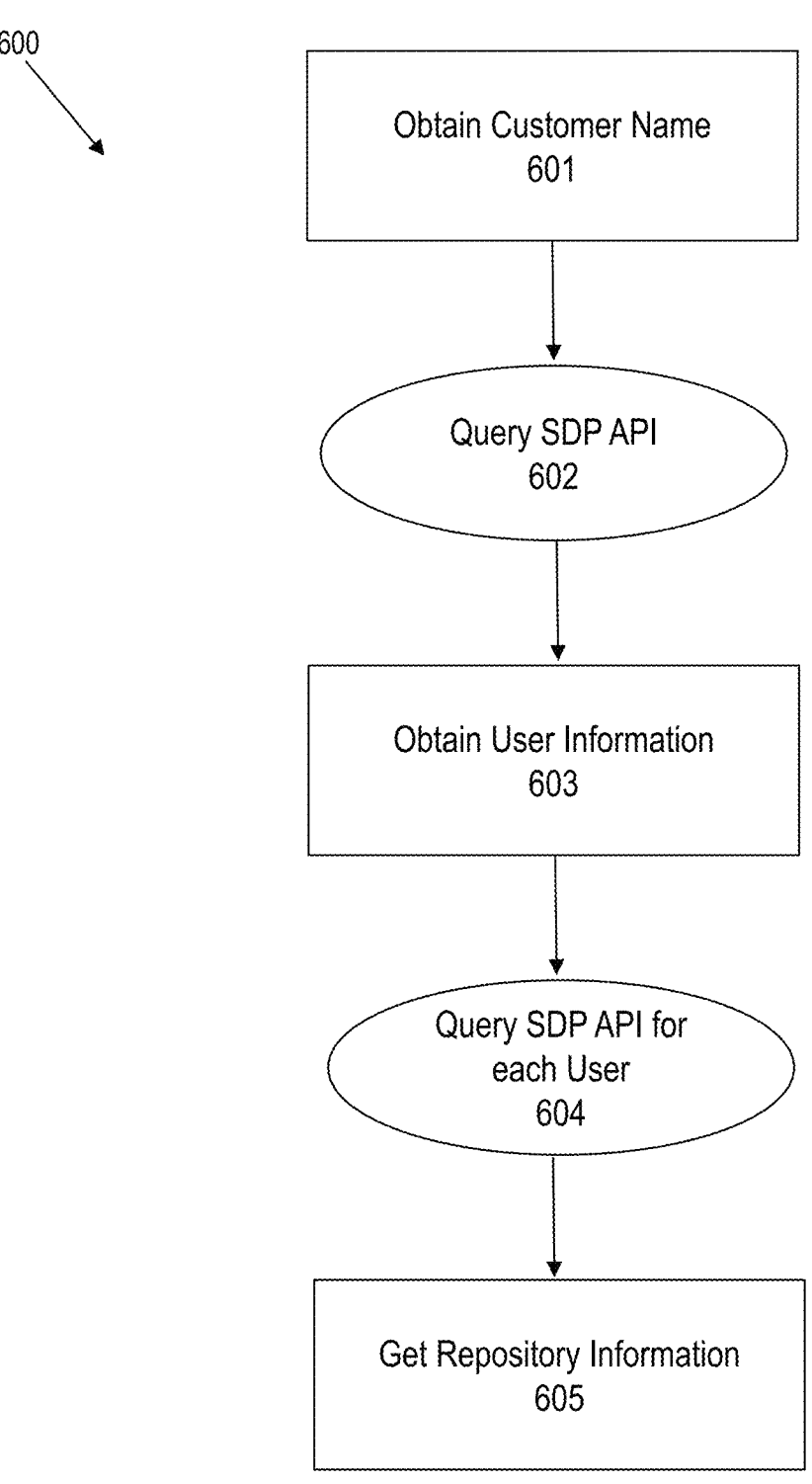
FIG. 6 is a flow chart on an exemplary data gathering process in accordance with one aspect of the instant disclosure.

One aspect of the method 500 can include identifying 502 the customer's public repository. The repository can be identified 502 on an SDP, for example GitHub. More generally, the identifying 502 can identify if/which SDP is associated with the customer. The identifying 502 can identify the SDP based on the customer information or data and SDP data. The method 500 can include scanning 503 the SDP for data leakage. The scanning 503 can include a process of scanning the data on a repository of the SDP for sensitive or confidential data. Sensitive data can include passwords, keys, tokens, code, and other confidential or undisclosed information. The scanning 503 can be responsive to the identifying 502 positively identifying that the SDP or repository belongs to the customer. More generally, the scanning 503 can involve scanning an identified repository. In some aspects, the method 500 can include any of the obtaining 501, the identifying 502, and the scanning 503. The method 500 can include first obtaining 501 customer information for scanning, then identifying 502 customer's public repositories on the SDP, and the scanning 503 the repository for data leakage of sensitive data Turning now to FIG. 6, an alternative embodiment of a data gathering method 600 is shown and described. The data gathering method 600 can include obtaining the customer's name 601. The customer's name can be any name or tag associated with the customer. In example, the customer's name can be the common market name or trade name of the customer. The customer's name can include trademarks or other identifying labels or titles. The data gathering method 600 can include querying the SDP's API 602. For example, only the data gathering method 600 can include querying GitHub's API for information. The information can include data, parameters, or the like related to a plurality of users. In typical aspects, the querying the SDP API 602 can include defining one or more verification flags. The data gathering method 600 can include obtaining user information 603. The querying the SDP API 602 can define a first query. The obtaining user information 603 can be any parameter or data related to the user. For example, the user information can be a username, a profile picture, a user account creation data, a user account upload date, a website link, or any similar information related to the user. The data gathering method 600 can include a querying the SDP API for each user 604. The querying the SDP API for each user 604 can define a second query to the SDP API. The data gathering method 600 can include a getting repository information 605 step. The getting repository information 605 can include gathering data or parameters of a certain repository which is connected to the user. It is envisioned that the data gathering method 600 can identify which repositories of a plurality of repositories have a higher likelihood of being associated with the customer.

§ 5.1 Account Score Calculation & Identification

Figure 7:
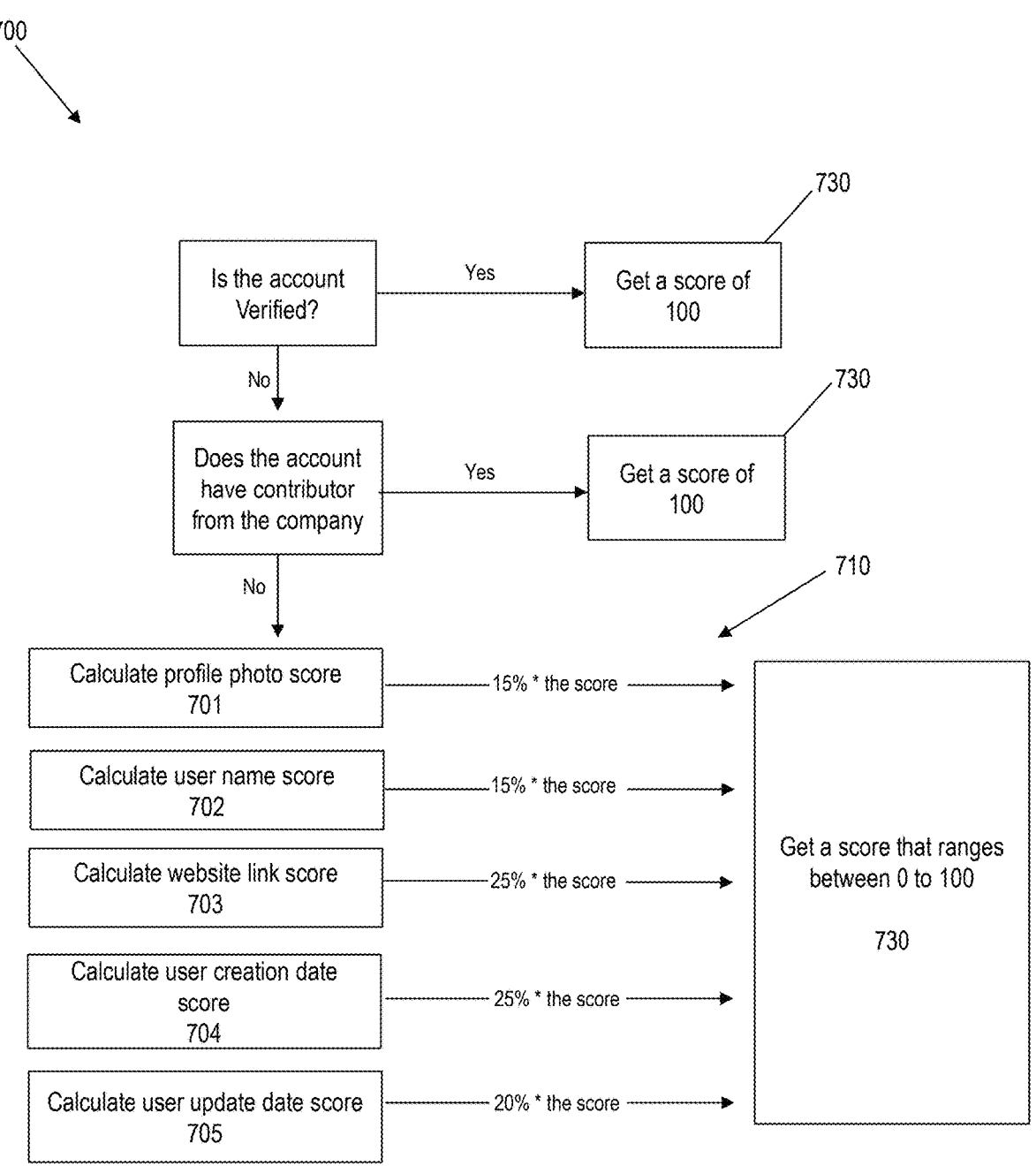
FIG. 7 is a flow chart of an exemplary calculation process in accordance with one aspect of the instant disclosure.

Turning now to FIG. 7, a flowchart for a calculation process 700 for the identification 502 is shown and described. The calculation process 700 can be configured to identify the likelihood that an SDP account is associated with a tenant. In one aspect, the calculation process 700 can include a query. The query can be based on an Applicant Programming Interface (API). For example, the query can interact with the API of the SDP, for example the API of GitHub. In an example embodiment without limitation, the query can query the GitHub API to get information, such as user information. The method can include a plurality of queries wherein one or more of the plurality of queries interact with the SDP API. The method can include getting repository information based on a user/account. More generally, the method can include, for each user, querying the SDP API to get all repository information related to the user. The query can be based on the customer's company name, or any other public information about the company. Importantly, the information related to the customer for the query can be publicly available. It is envisioned that, as a result of the public nature of the query information, no special authentication is required. In general, the query can identify if the repository belongs to the customer. The method can include scanning an SDP to determine if one or more repositories are associated with a user that is affiliated with the company. The method can also include scanning for repositories which contain information associated with the customer. For example, the query and more generally, the method can include scanning users and/or repositories which might contain information belonging to the company. In an exemplary aspect, the method can scan users and repositories for data which contains, for example, the name of the customer's company.

Once the repositories within an SDP are identified, the method can extract one or more attributes. In some aspects, a multiplicity of attributes is extracted. The method can make a request to the SDP API endpoint to retrieve attributes or manipulate data. The query can be a structured request and return response, wherein the response defines the attributes. In some aspects, the process can query all users and organizations in the SDP which contain the customer's name. The method can be configured to extract the attributed, which include without limitation a username, a verification flag, a profile photo, a website link, a creation date, an update date, and other repository related data. In some aspects, the process can extract one or more attributes from each repository of a user. For example, for each repository of the user or organization, one or more attributes can be extracted. In further example, such extracted attributes can define, but are not limited to a creation date of the repository, an update date of the repository, and a one or more contributors to the repository.

The calculation process 700 can determine if the account is verified. More specifically, the calculation process 700 can determine if the user account of the SDP actually belongs to the user. The query can identify if an account is verified and/or belongs to the customer or user. Similarly, the calculation process 700 can determine if the account has a contributor belonging to the company. More generally, the calculation process 700 or query can determine if one or more contributors of the repository are associated with the customer, for example via the customer name. In example only, and without limitation, the calculation process 700 can determine if the user of the SDP bears any resemblance to the customer by sharing a common name, for example the name of the customer or company name.

The calculation process 700 can extract a profile photo 701. The profile photo 701 can be an image associated with the user's account and can be used to visually represent the user in the SDP. The calculation process 700 can extract a username 702. The username 702 can be a piece of information for authentication and can typically serve as a unique identifier for a user account. The calculation process 700 can extract a website link 703 which can be compared to the customer's website. The calculation process 700 can extract a user creation date 704, wherein the user creation data results from timestamp of the creation of the repository based on the user. The calculation process 700 can extract a an update date 705. The update date 705 can correspond to latest date the repository was updated by a user.

In some aspects, the calculation process 700 can assign a score 730 as a result of the parameters being considered. The score can range from 0 to 100 and can be adapted to assess the degree of similarity between the user and the company. For example, based on at least one portion of the process described herein, the process can evaluate the parameters and provide a score, wherein the score increases as the likelihood as determined by the process increases of the user being associated with the customer. For example, if the process determines that the user account is verified, then the calculation process 700 can assign a score 730 off 100 to the user account and establish that the account is very likely associated with the customer. In further example, the calculation process 700 can determine if the user account or repository has a contribution or contributor from the company. If the determination is yes, then the process can assign a score of 100 to the account or user and determine that the account is highly likely associated with the company. The score 730 can be automatically assigned or calculated. For example, if the calculation process 700 or query determines that the account is verified, the calculation process 700 can automatically assign a score of 100 to the account. In an alternative example, if the account is not verified and no contributor from the company is identified, then one or more parameters can be used to calculate the score 730 which can range between 0 and 100.

The calculation process 700 can compare the username 702 to the company name to assess the degree of similarity. If the username 702 of the user matches the name of the customer, the calculation process 700 can give the username 702 attribute a score of 100. If the name of the customer is included in the username 702 of the user, the calculation process 700 can give the username 702 attribute a score of 85. If there is no match between the customer's name and the username 702 of the user, the calculation process 700 can give the username 702 attribute a score of 0. In some aspects, each user or organization can define a verification flag. The verification flag can be a Boolean or status indicator used to signify whether a certain process, action, or condition has been validated. Each user or organization can define a unique verification flag. Each verification flag can define a true state or a false state, wherein the true state can represent that the user has been verified and the false state can represent that the user has not been verified. The calculation process 700 can give a score 730 of 100 to the user or organization if the verification flag of the user is set to true. The calculation process 700 can give a score 730 of 0 to the user or organization if the verification flag of the user is set to false. Again, as the score 730 increases, the likelihood of the user or data repository being associated with the customer increases.

The calculation process 700 can scan for the profile photo 701. If the user has a profile photo 701 attribute, the calculation process 700 can compare the profile photo 701 to a list of photos associated with the customer, for example a photo of a company logo. The company photo can be obtained from the internet. The profile photo 701 of the user can be compared to the company photo, such as the company logo with a photograph comparison algorithm. The photograph comparison algorithm can be any photograph comparison algorithm known to one of skill in the art. In example only, and without limitation, the photograph comparison algorithm can be a Favicon Comparison algorithm. If the profile photo 701 of the user is detected as being very similar the customer's logo, the calculation process 700 can give the user a score 730 of 100 for the profile photo score. If the profile photo 701 of the user/account is not similar to the customer's logo, the calculation process 700 can give the user/account a score 730 of 0 for the profile photo score. It will be appreciated that the profile photo score 701 can range between 0 and 100 based on the similarity of the profile photo to the companies logo.

The website link 703 can be an attribute associated with the user. Moreover, the website link 703 can be published by the user on the account or repository. The website link 703 can be a dedicated attribute of the user. If the SDP, such as and with limitation GitHub user account contained the website link 703 that has been published, the calculation process 700 can compare it to the customer's website. If the website link 703 as published by the user is detected as the customer's website, the calculation process 700 can give the website link 703 attribute a score 730 of 100. If the website link 703 published by the user is not detected as the customer's website, the calculation process 700 can give the website link 703 attribute a score 730 of −1. If the user does not publish the website link 703, the calculation process 700 can give the website link 703 attribute a score 730 of 0. In general, if the website link 703 matches the website of the customer, the user is typically associated with the customer, and if the website link 703 does not match the customer's website, the user is most likely not associated with the customer. The creation date 704 can be the timestamp or age of the user account on the SDP. In general, the older the user, the more likely that the user is an original customer's user. Conversely, newer user accounts can indicate that the user account is more likely a fake. For example, if a malicious user wanted to create a fishing user, most likely the user will be newer than older. Therefore, in various embodiments, if the user was created more than 365 days ago from the timestamp of the query, the calculation process 700 can give the creation date 704 attribute a score 730 of 100. If the user was created more than 180 days ago from the timestamp of the query, the calculation process 700 can give the creation date 704 attribute a score 730 of 80. If the user was created more than 30 days from the timestamp of the query, the calculation process 700 can give the creation date 704 attribute a score 730 of 50. If the user was created more than 7 days from the timestamps of the query, the calculation process 700 can give the creation date 704 attribute a score 730 of 10. If the user was created less than 7 days from the timestamp of the query, the calculation process 700 can give the creation date 704 attribute a score 730 of 0. The user update date 705 score 730 can be calculated based on the same logic and method as the user creation date 704 score.

The calculation process 700 can identify the user based on any combination of parameters described herein and can assign a score based on one or more of the parameters. For example, the calculation process 700 can provide the score 730 based on the aggregate score 730 of multiple parameters, wherein the aggregate score can be derived from a weighted summation. Again, the calculation process 700 can generate the score 730 based on the parameters, wherein the score is related to the user. The score 730 can range between 0 and 100, as the score increases with the likelihood that the user is associated with the customer. In example only, the calculation process 700 can first obtain customer or tenant information, such as the name of the customer. The calculation process 700 can query the SDP API to obtain one or more user attributes for one or more users. The calculation process 700 can query the SDP API for each based on the all user information. In some aspects, the calculation process 700 can define the score 730, wherein the score is a weighted sum defining the likelihood the user is associated with the customer. The following table provides an exemplary weighting scheme 710 for the example parameters discussed.

| Parameter | Weighted Value (Percentage of the score) |
|---|---|
| Profile Photo | 15% |
| Username | 15% |
| Website Link | 25% |
| User Creation data | 25% |
| User Update date | 20% |
| Verified Account | If yes - Score of 100 |
| Company Contributor | If yes - Score of 100 |

In an example only, and without limitation, if the calculation process 700 identifies a user of the plurality of users identified in a query, the process queries the user or user account for any of the parameters above. If in example, the user account includes a profile picture which matches the company logo, a website link which matches the company website, and has a username which does not match the company username, the calculation process 700 could generate the following score 730 for the user:

$$\text{Score} = \sum(\text{observed attributes score})(\text{weigthted value of attribute}) =$$
$$(100)\cdot 15 + (100)\cdot 25 + (0)\cdot 15 = 40$$

The calculation process 700 can query data related to repositories associated with each suspected user and/or organization. The suspected user and/or organization can be determined based on the score 730. The process can use an API call to get information about the repositories associated with suspected users. Alternatively, the calculation process 700 can include an API call to get information related to the contributors of a given repository. More generally, the Calculation process 700 can include scanning a repository for information, data, or attributes. For each suspected user and/organization, the calculation process 700 can query data related to any of the associated repositories and can perform checks. The checks can scan for attributes via, for example, an API call. The calculation process 700 can scan each repository for attributes. The repository can define a repository creation date. In some aspects, the older the repository is, the more likely the repository is associated with an original customer's repository. Concurrently, the younger the repository's creation date, the more likely the repository is fake. The repository creation date score can be calculated Mutatis *Mutandis* to the creation date 704 score.

The calculation process 700 can query the API of the SDP to identify a repository update date parameter. In some aspects, the later the repository was updated the more likely that the repository is a real, live, and/or updating repository associated with the user. Concurrently, the earlier repository update date, the more likely the repository is fake. The repository update date score can be calculated Mutatis *Mutandis* to the update date 705 score. The calculation process 700 can scan users and/or repositories based on an API call to identify contributor. In some aspects, for each repository, the calculation process 700 can extract some or all details of the repositories' contributors. If the contributors define a common email address, the calculation process 700 can check if the contributors' email addresses belong to the company by the domain name. If the email addresses belong to the company, the score of the user and/or organization that owns the repository can be given a score 730 of 100. The calculation process 700 can determine that the repository belongs to the customer.

Once the repository or repositories are identified, the calculation process 700 can include scanning the identified repository for sensitive information. Importantly, the calculation process 700 is adapted to quickly identify suspicious users and/or accounts much faster and potentially with greater accuracy than a human. The process can be implemented on a computation device. Again, the calculation process 700 can, once the repository associated with a suspicious account has been identified, scan the repository for data leakages or sensitive information, thereby detecting data leakages or sensitive information associated with a tenant within an SDP.

§ 5.2 Process for Automatic SDP Repository Identification

Figure 8:
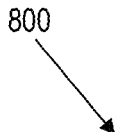
FIG. 8 is a flow chart of a process for public SDP repositories locating in accordance with another aspect of the instant disclosure.
Figure 8:
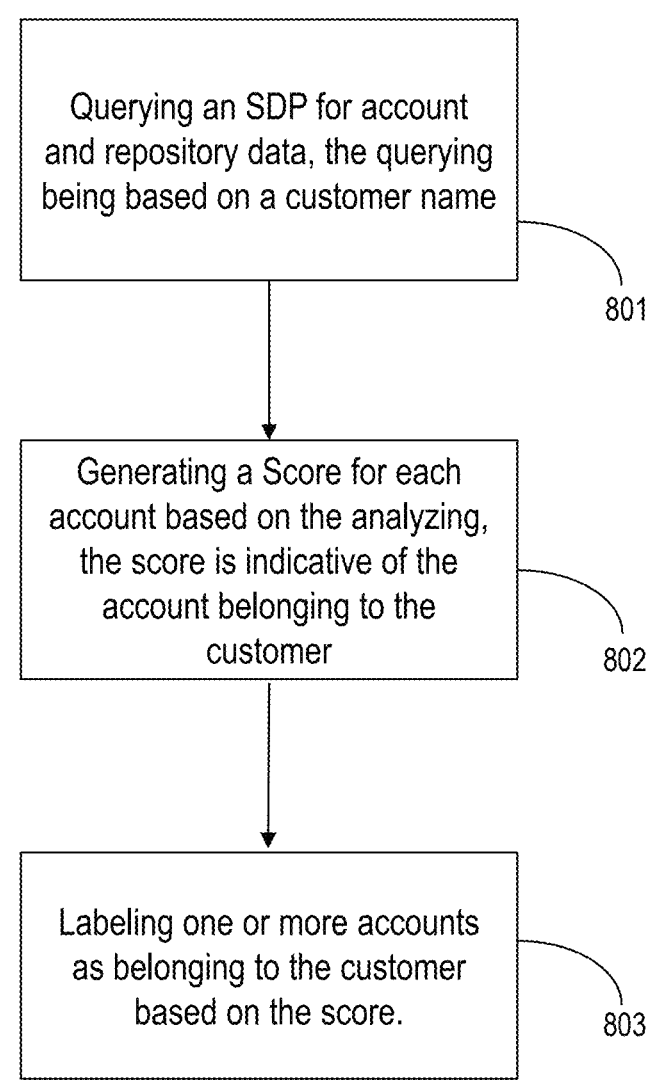

Turning now to FIG. 8, a process 800 for automatically identifying public SDP repositories is shown and described. The process 800 can include querying 801 a SDP for account and/or repository data. The querying 801 can be based on customer information, for example a customer name. The process 800 can include generating 802 the score 730 for each account of the plurality of accounts based on the analyzing. The score 730 can be indicative of an account belonging to the customer. The process 800 can include labeling 803 one or more of the accounts of the plurality of accounts as belonging to the customer based on the score.

The process 800 can include the account and/or repository data defining parameters including without limitation the username, the profile picture, the website link, the creation date, the update date, repositories, and associated repositories. The repository data can include a creation date, an update date, and contributors. The contributors can be any users associated with the repository. The process can include wherein the score is a composite score based on any of the profile photo, the username, the website link, and the user creation date. The process 800 can include wherein the account and repository data further include the username, and wherein the analyzing further includes comparing the username to the customer name via a one or more name comparison model. The process can implement a name comparison model. The name comparison model can be implemented by the process and can match or compare names across different data sets or inputs. The name comparison model can include fuzzy matching, exact matching, and can optionally use machine learning algorithms to compare names based on various characteristics. The process 800 can implement a photo comparison model. The photo comparison model can be a model implemented by network software and can be configured to determine whether two images belong to the same entity or if they are similar. The photo comparison model can include image preprocessing, normalization, character detection, deep learning-based detectors, Haar cascades, feature extraction, similarity measurements, and classification schemes.

The process 800 can include wherein the account and repository data includes a verification flag, and wherein the analyzing further includes determining for each of the plurality of accounts, if the verification flag is present. Again, the verification flag can be a label to signify if the SDP account has been verified. The process 800 can include wherein the account and/or repository data includes the website link, and wherein the analyzing further includes comparing the website link to a known customer website link. In other aspects, the process 800 can perform a check to determine the website link is associated with the customer. The process 800 can include wherein the account and repository data includes a creation date, and wherein the analyzing further includes comparing the creation date to a current date and determining an age of the account and/or repository data.

The process 8000 can include wherein the account and repository data further include an update date, and wherein the analyzing further includes comparing the update date to a current date and determining a duration between the current date and the update date. The process 800 can include wherein the account and/or repository data includes one or more contributor details, and wherein the analyzing further includes determining if the one or more contributor details belong to the client via a contributor detail verification model.

Processing Circuitry and Non-Transitory Computer-Readable Mediums

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); Programmable Logic Device (PLD), or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each equipped with processing circuitry. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

CONCLUSION

As used herein, including in the claims, the phrases "at least one of" or "one or more of" a list of items refer to any combination of those items, including single members. For example, "at least one of: A, B, or C" covers the possibilities of: A only, B only, C only, a combination of A and B, a combination of A and C, a combination of B and C, and a combination of A, B, and C. Additionally, the terms "comprise," "comprises," "comprising," "include," "includes," and "including" are intended to be non-limiting and open-ended. These terms specify essential elements or steps but do not exclude additional elements or steps, even when a claim or series of claims includes more than one of these terms.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

Although operations, steps, instructions, and the like are shown in the drawings in a particular order, this does not imply that they must be performed in that specific sequence or that all depicted operations are necessary to achieve desirable results. The drawings may schematically represent example processes as flowcharts or flow diagrams, but additional operations not depicted can be incorporated. For instance, extra operations can occur before, after, simultaneously with, or between any of the illustrated steps. In some cases, multitasking and parallel processing might be beneficial. Furthermore, the separation of system components described should not be interpreted as mandatory for all implementations, as the program components and systems can be integrated into a single software product or distributed across multiple software products.

What is claimed is:

1. A method implemented by a cloud-based system, the method comprising steps of:

querying a software development platform for account and repository data, the querying being based on a customer name, wherein the account and repository data include usernames, verification flags, profile photos, website links, a creation date, an update date, and associated repositories, and wherein the repository data comprises a creation date, an update date, and contributors;

for each account of a plurality of accounts, analyzing associated account and repository data;

generating a score for each account of the plurality of accounts based on the analyzing, the score being indicative of an account belonging to the customer, wherein the score is a composite score derived from a combination of attribute scores for a plurality of the profile photo, the username, the website link, and the creation date, and wherein presence of the verification flag or a contributor associated with the customer assigns a maximum score;

labeling one or more accounts of the plurality of accounts as belonging to the customer based on the score; and responsive to labeling, scanning one or more repositories associated with the labeled one or more accounts for sensitive information to prevent data leakage, and upon detecting the sensitive information, generating an alert or initiating a remedial action.

2. The method of claim 1, wherein the account and repository data further include a username, and wherein the analyzing further comprises comparing the username to a customer name via one or more name comparison models.

3. The method of claim 1, wherein the account and repository data include a verification flag, and wherein the analyzing further comprises determining, for each of the plurality of accounts, if the verification flag is present.

4. The method of claim 1, wherein the account and repository data include a profile photo, and wherein the analyzing further comprises comparing the profile photo to a list of photos of a logo associated with the customer via a photo comparison model.

5. The method of claim 1, wherein the account and repository data include a website link, and wherein the analyzing further comprises checking the website link to a known customer website link.

6. The method of claim 1, wherein the account and repository data include a creation date, and wherein the analyzing further comprises comparing the creation date to a current date and determining an age of the account and repository data.

7. The method of claim 1, wherein the account and repository data include an update date, and wherein the analyzing further comprises comparing the update date to a current date and determining a duration between the current date and update date.

8. The method of claim 1, wherein the account and repository data include one or more contributor details, and wherein the analyzing further comprises determining if the one or more contributor details belong to the client via a verification contributor detail model.

9. A non-transitory computer-readable medium comprising instructions that, when executed, cause one or more processors to perform steps of:

querying a software development platform for account and repository data, the querying being based on a customer name, wherein the account and repository data include usernames, verification flags, profile photos, website links, a creation date, an update date, and associated repositories, and wherein the repository data comprises a creation date, an update date, and contributors;

for each account of a plurality of accounts, analyzing associated account and repository data;

generating a score for each account of the plurality of accounts based on the analyzing, the score being indicative of an account belonging to the customer, wherein the score is a composite score derived from a combination of attribute scores for a plurality of the profile photo, the username, the website link, and the creation date, and wherein presence of the verification flag or a contributor associated with the customer assigns a maximum score;

labeling one or more accounts of the plurality of accounts as belonging to the customer based on the score; and responsive to labeling, scanning one or more repositories associated with the labeled one or more accounts for sensitive information to prevent data leakage, and upon detecting the sensitive information, generating an alert or initiating a remedial action.

10. The non-transitory computer-readable medium of claim 9, wherein the account and repository data further include a username, and wherein the analyzing further comprises comparing the username to a customer name via one or more name comparison models.

11. The non-transitory computer-readable medium of claim 9, wherein the account and repository data include a verification flag, and wherein the analyzing further comprises determining, for each of the plurality of accounts, if the verification flag is present.

12. The non-transitory computer-readable medium of claim 9, wherein the account and repository data include a profile photo, and wherein the analyzing further comprises comparing the profile photo to a list of photos of a logo associated with the customer via a photo comparison model.

13. The non-transitory computer-readable medium of claim 9, wherein the account and repository data include a website link, and wherein the analyzing further comprises checking the website link to a known customer website link.

14. The non-transitory computer-readable medium of claim 9, wherein the account and repository data include a creation date, and wherein the analyzing further comprises comparing the creation date to a current date and determining an age of the account and repository data.

15. The non-transitory computer-readable medium of claim 9, wherein the account and repository data include an update date, and wherein the analyzing further comprises comparing the update date to a current date and determining a duration between the current date and update date.

16. The non-transitory computer-readable medium of claim 9, wherein the account and repository data include one or more contributor details, and wherein the analyzing further comprises determining if the one or more contributor details belong to the client via a verification contributor detail model.

* * * * *